United States Patent
Hosek et al.

(10) Patent No.: US 10,940,594 B2
(45) Date of Patent: Mar. 9, 2021

(54) ROBOT ARM WITH HIGH CAPACITY ADJUSTABLE JOINT

(71) Applicant: Persimmon Technologies Corporation, Wakefield, MA (US)

(72) Inventors: Martin Hosek, Lowell, MA (US); Tuan Thuc Ha, Randolph, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 0 days.

(21) Appl. No.: 14/940,192

(22) Filed: Nov. 13, 2015

(65) Prior Publication Data

US 2016/0067869 A1    Mar. 10, 2016

Related U.S. Application Data

(63) Continuation of application No. 13/795,736, filed on Mar. 12, 2013, now abandoned.

(60) Provisional application No. 61/668,661, filed on Jul. 6, 2012.

(51) Int. Cl.
   *B25J 17/02*    (2006.01)
   *B25J 9/04*    (2006.01)

(52) U.S. Cl.
   CPC .......... *B25J 17/0258* (2013.01); *B25J 9/042* (2013.01); *B25J 17/02* (2013.01); *Y10S 901/29* (2013.01); *Y10T 74/20335* (2015.01)

(58) Field of Classification Search
   CPC . B25J 15/04; B25J 15/045; B25J 17/02; B25J 19/0066; H01L 21/67742; H01L 21/68707
   See application file for complete search history.

(56) References Cited

U.S. PATENT DOCUMENTS

| 4,068,763 A * | 1/1978 | Fletcher ................. B25J 9/0087 901/29 |
|---|---|---|
| 4,582,191 A | 4/1986 | Weigand |
| 4,596,415 A | 6/1986 | Blatt |
| 4,660,274 A | 4/1987 | Goumas et al. |
| 5,044,063 A | 9/1991 | Voellmer |
| 5,858,101 A | 1/1999 | Begin et al. |
| 6,874,834 B2 | 4/2005 | McIntosh |
| 6,988,696 B2 * | 1/2006 | Attee ...................... B25B 5/147 248/214 |
| 7,381,876 B2 | 6/2008 | Miyajima |

(Continued)

FOREIGN PATENT DOCUMENTS

| JP | 07108483 A | 4/1995 |
|---|---|---|
| JP | 09213768 A | 8/1997 |
| JP | 2008142880 A | 6/2008 |

OTHER PUBLICATIONS

Alexnld.com "US Chin to Universal Plug Adapter 2 Pins Flat Pin" accessed on Jan. 2, 2020, https://alexnld.com/product/us-chn-universal-plug-adapter-2-pins-flat-pin/ (Year 2019).

*Primary Examiner* — Gerald McClain
(74) *Attorney, Agent, or Firm* — Harrington & Smith

(57) ABSTRACT

A robot arm includes a wrist, an end effector, and an adjustable joint coupling the end effector to the wrist. The adjustable joint includes a member received in a socket. In one example, the member is a ball. In another example, the member is a tang. In both examples, an upper flange and a lower flange can be used to couple the wrist to a forearm.

12 Claims, 9 Drawing Sheets

(56) References Cited

U.S. PATENT DOCUMENTS

| | | | |
|---|---|---|---|
| 7,609,020 B2* | 10/2009 | Kniss | B25J 15/0061 |
| | | | 901/29 |
| 10,005,190 B2* | 6/2018 | Ha | H01L 21/67742 |
| 10,090,188 B2* | 10/2018 | Thanu | H01L 21/68707 |
| 2003/0116985 A1 | 6/2003 | Moilanen | |
| 2003/0177656 A1* | 9/2003 | Sawdon | B25J 9/1692 |
| | | | 33/645 |
| 2005/0285419 A1* | 12/2005 | Matsumoto | H01L 21/67742 |
| | | | 294/213 |
| 2008/0182738 A1 | 7/2008 | Grunke et al. | |
| 2008/0257095 A1 | 10/2008 | Kent | |
| 2018/0104828 A1* | 4/2018 | Hosek | B25J 17/02 |
| 2018/0261484 A1* | 9/2018 | Martin | H01L 21/67766 |
| 2018/0261490 A1* | 9/2018 | Martin | H01L 21/67766 |

* cited by examiner

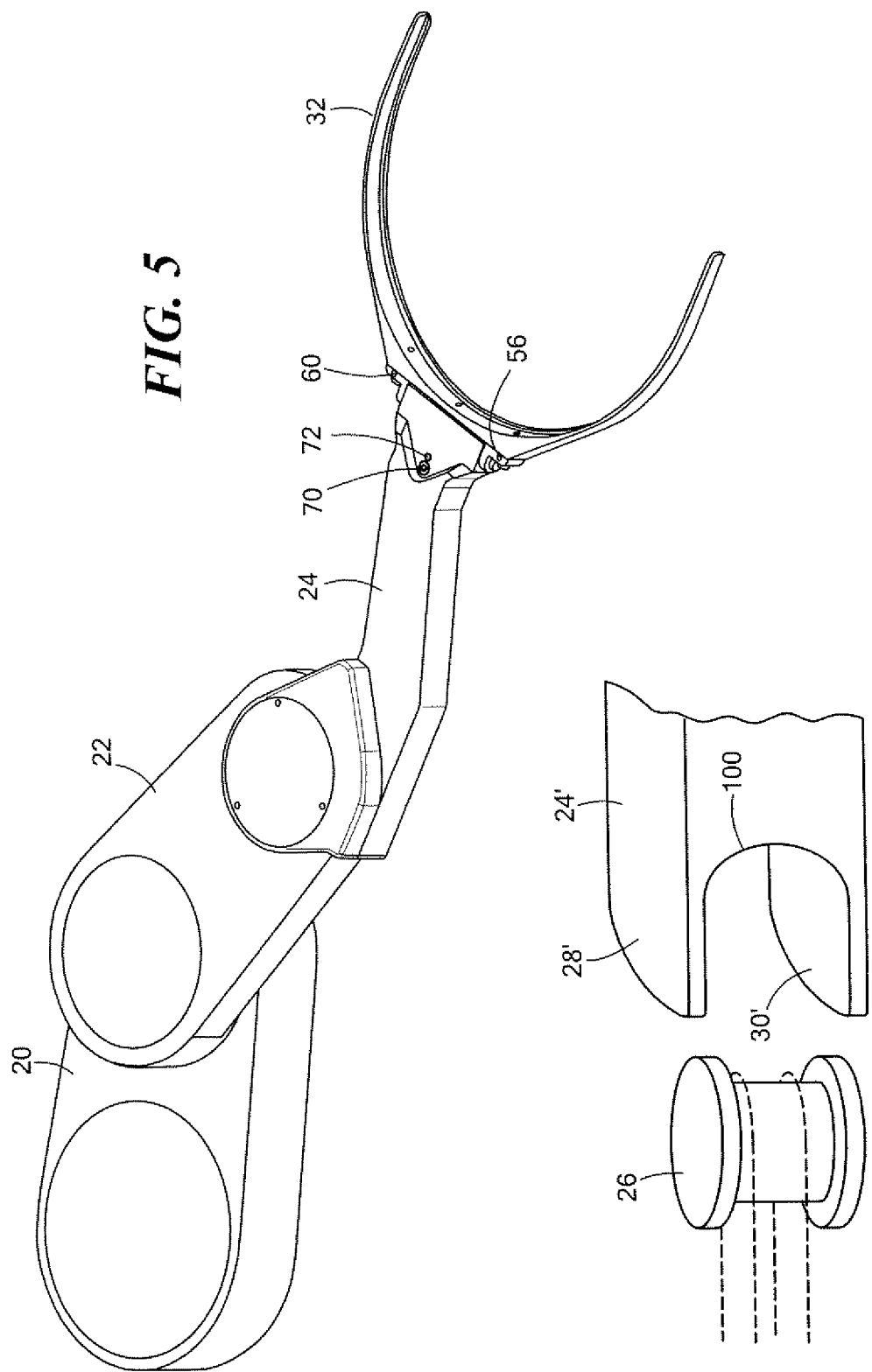

ROBOT ARM WITH HIGH CAPACITY ADJUSTABLE JOINT

RELATED APPLICATIONS

This application is a continuation of U.S. patent application Ser. No. 13/795,736 filed Mar. 12, 2013, and claims benefit of priority thereto under 35 U.S.C. §§ 119, 120, 363, 365 and 37 C.F.R. §§ 1.55 and 1.78, which claims benefit of and priority to U.S. Provisional Application Ser. No. 61/668,661 filed Jul. 6, 2012 under 35 U.S.C. §§ 119, 120, 363, 365, and 37 C.F.R. § 1.55 and § 1.78 and is incorporated herein by this reference.

FIELD OF THE INVENTION

The invention relates to a robot arm for transporting wafers, solar panels, liquid crystal display screens, and other substrates.

BACKGROUND OF THE INVENTION

Various substrate robot arms are known. Some include a shoulder driven by drive isolated from the vacuum environment. A forearm link articulates with respect to the shoulder and a wrist link articulates with respect to the forearm. A substrate holding/carrying end effector is fixed to the wrist.

SUMMARY OF THE INVENTION

It is desirable to be able to adjust the end effector attachment to the wrist. An end effector adjustment in elevation is desirable. An end effector adjustment in roll and/or pitch is also desirable. Furthermore, improvements in the connection of the wrist to the forearm are desirable.

In examples of the invention, the end effector is coupled to the wrist via an adjustable joint. In some examples, a stronger, higher capacity arm is realized by a unique connection between the wrist and the forearm.

Featured is a robot arm comprising at least first and second joined links and a driven rotating drum at one end of the first link. Other drives or any suitable joint driven structure may be used. Spaced upper and lower flanges are both connected to the second link and to the rotating drum. Preferably, the top flange is connected to the second link and to the lower flange. In one example, the first link is a forearm the second link is a wrist. The end of the forearm is typically rounded and so the first flange may include a curved depending skirt spaced from the rounded forearm link end. A plate extends laterally from the depending curved skirt which is attached to the drum.

There may be a wafer handling end effector connected to the wrist and adjustment means for the end effector for adjusting the pitch and roll of the end effector with respect to the wrist link independently. In one example, brackets are fastened to the wrist and to the end effector each with an adjustable set screw for setting the roll of the end effector.

There can be a ball joint between the end effector and the wrist which, in one design, includes a pin extending rearwardly from the end effector through an ear of the wrist. In one version, the end effector has a tang extending rearwardly therefrom which is received in a concave receptacle in the wrist. The tang surrounds the pin. The tang is typically fastened to the wrist and an adjustable set screw in the wrist abuts the tang for adjusting the pitch of the end effector.

Also featured is a robot arm comprising a wrist, an end effector coupled to the wrist via an adjustable joint, and a leveling adjustment at the adjustable joint.

In one version, the adjustable joint includes a socket on the wrist and an end effector tang received in the socket. Further included may be brackets fastening the end effector to the wrist with adjustable set screws varying the orientation of the end effector with respect to the brackets. The socket may include an ear and the tang may include a pin received in the ear. A set screw in the wrist preferably abuts the tang for adjusting the pitch of the end effector.

In another design, the adjustable joint includes a socket on the end effector receiving a ball of the wrist. Further included may be a sleeve between the ball and the socket. The sleeve may be in a plurality of sections and may have a shoulder seated on the socket periphery. A set screw in the wrist may abut the end effector for leveling the end effector. The socket can be split and tightenable about the ball.

In another design, an extension extends between the end effector and the wrist. There may be two spaced end effectors secured to two spaced extensions. The end effectors may each include a stationary block secured to the extension and an adjustable block adjustably secured to the stationary block. The leveling adjustment may include a bore in the adjustable block receiving a fastener from the stationary block and a spring between the adjustable block and the stationary block. Further included may be pins of the stationary block received in bores in the adjustable block.

In some embodiments, a forearm has a drive for the wrist. The drive may be a rotating drum. Preferably, there is an upper flange and a lower flange coupling the wrist to the rotating drum. In some versions, the top flange is secured to the lower flange.

Also featured is a robot arm comprising a wrist, an end effector, and an adjustable joint coupling the end effector to the wrist. The adjustable joint includes a member received in a socket. In one embodiment, the member is a ball. In another embodiment, the member is a tang. In both designs, there may be an upper flange and a lower flange coupling the wrist to a forearm.

The disclosed embodiment, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 5 is a schematic three dimensional top view showing an example of a robot arm in accordance with an example of the disclosed embodiment;

FIG. 6 is a highly schematic three dimensional side view of a robot arm joint in accordance with examples of the disclosed embodiment;

DETAILED DESCRIPTION OF THE INVENTION

Figure 1:
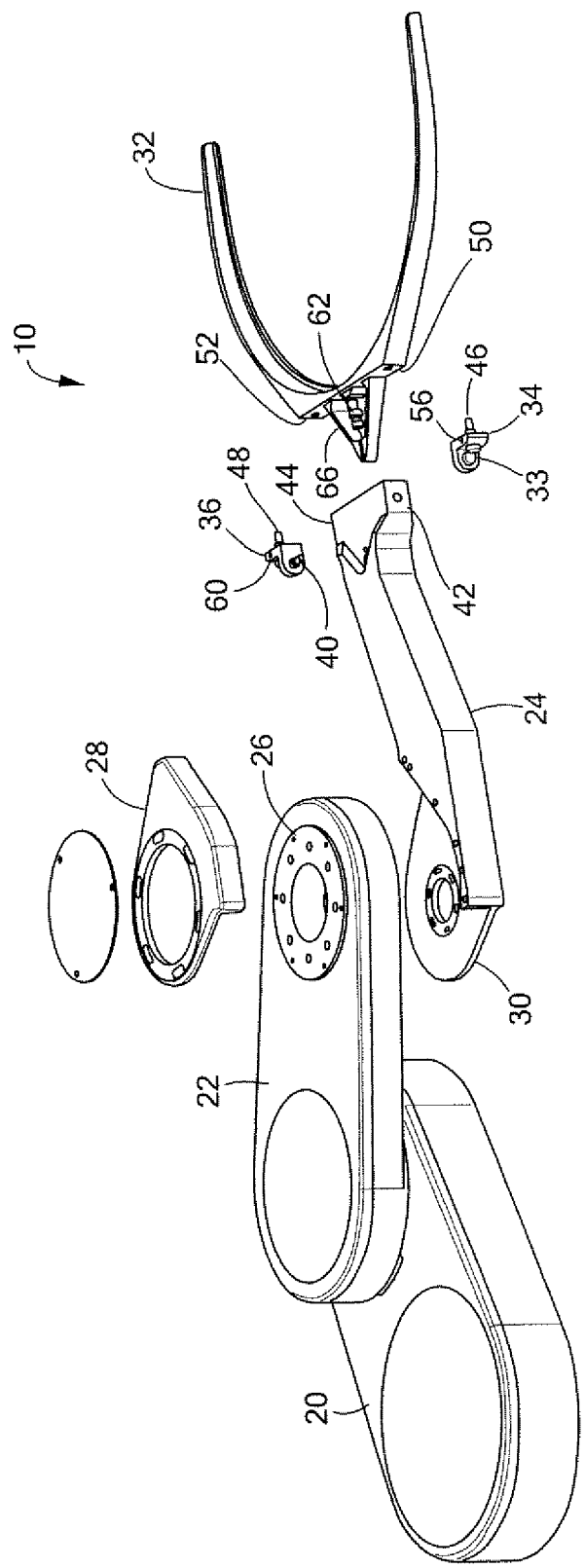
FIG. 1 is a schematic three dimensional exploded view showing the primary components associated with one version of a robot arm in accordance with an example of the disclosed embodiment.
Figure 2:
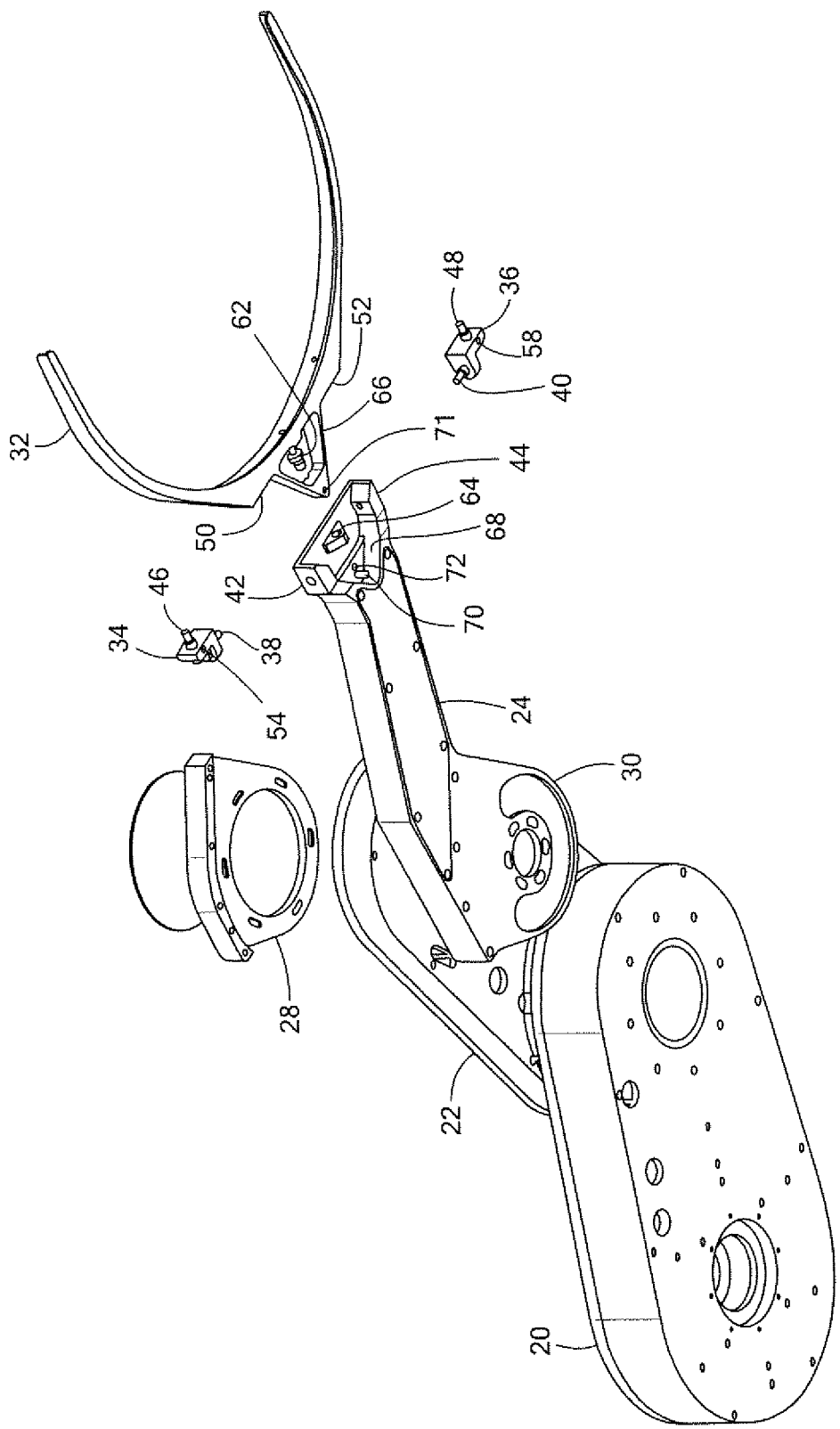
FIG. 2 is a schematic three dimensional exploded bottom view of the components shown in FIG. 1.
Figure 3:
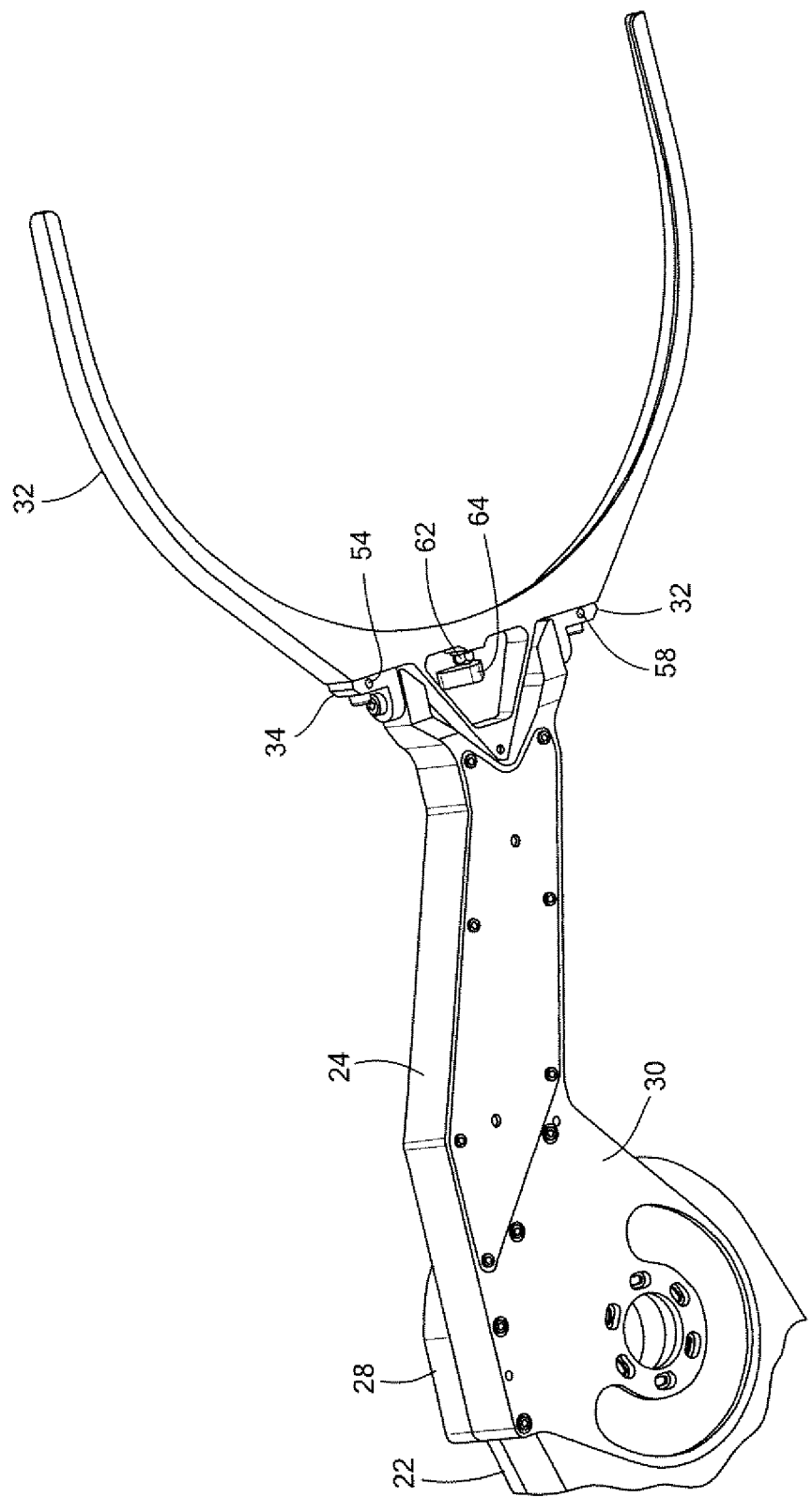
FIG. 3 is a schematic three dimensional bottom view of an assembled robot arm in accordance with an example of the invention.
Figure 4:
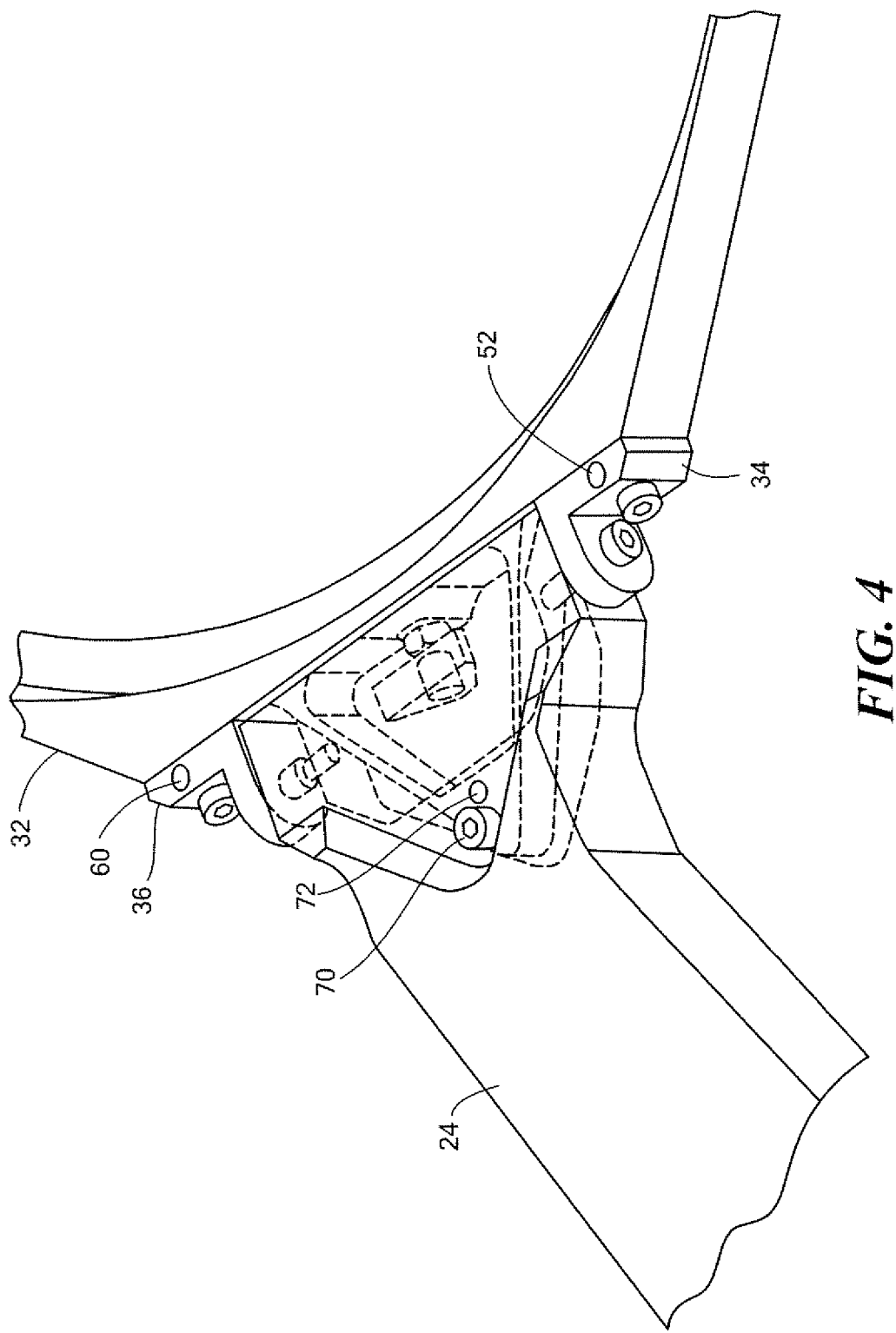
FIG. 4 is a schematic three dimensional partially cut away view showing an example of the leveling means or features in one version of the disclosed embodiment.

Aside from the embodiment or embodiments disclosed below, the disclosed embodiment is capable of other embodiments and of being practiced or being carried out in various ways. Thus, it is to be understood that the disclosed embodiment is not limited in its application to the details of construction and the arrangements of components set forth in the following description or illustrated in the drawings. If only one embodiment is described herein, the claims hereof are not to be limited to that embodiment.

Moreover, the claims hereof are not to be read restrictively unless there is clear and convincing evidence manifesting a certain exclusion, restriction, or disclaimer.

As shown in FIG. 1, in one example, a robot arm 10 includes a shoulder or upper arm link 20 typically driven by a drive subsystem. The shoulder link 20 drives the forearm link 22 which, in turn drives the wrist link 24 via driven rotating drum 26 shown. In alternate aspects, other drives are possible. Spaced upper 28 and lower 30 flanges are connected to bath the wrist link 24 and to rotating drum 26 at the end of the forearm in link. The result is a stronger, higher capacity arm. In one version shown, the upper flange 28 skirt 100 is rounded and fastened to the wrist link 24 via the lower flange 30. In one particular example, the bottom flange extends rearwardly from the bottom of the wrist link and is a component of the wrist link.

Referring also to FIGS. 2 through 5, an end effector 32 may be coupled to the wrist link 24 via an adjustable joint with a leveling adjustment. End effector 32 may be adjustable in pitch and roll independently. In the example shown, there are brackets 34, 36 with fasteners or shoulder screws 38, 40 fastened to the wrist distal sides 42, 44 and fasteners or shoulder screws 46, 48 fastened to the end effector proximate face 50, 52. Each bracket 34, 36 features one or more adjustable set screws 54, 56, 58, 60 for setting the roll of the end effector. Also, there is socket joint between the end effector and the wrist with a pin 62 extending rearwardly from the end effector 32 through an ear 64 having a socket receiving portion of the wrist 24. The member or tang 66 about the pin is received in a concave socket 68, FIG. 2 at the distal end of the wrist 24 and fastened to the wrist via the screw or shoulder screw 70. The set screw 72 adjacent to the shoulder screw 70 in the wrist 24 abuts the tang 66 for adjusting the pitch of the end effector 32.

FIG. 6 depicts how, in other designs, link 24' includes spaced flange portions 28', 30' coupled to a rotating or driven assembly such as a drum 26 which typically is a component of an adjacent robot arm link. Fasteners or the like can be used to fasten the flanges to the upper and lower surfaces of the drum. Such a joint could be at the wrist, and/or the elbow, and/or the shoulder. In another example, one link, for example a forearm, drives numerous other links, for example, end effectors. Such a joint can be used multiple times in such an embodiment.

Figure 7:
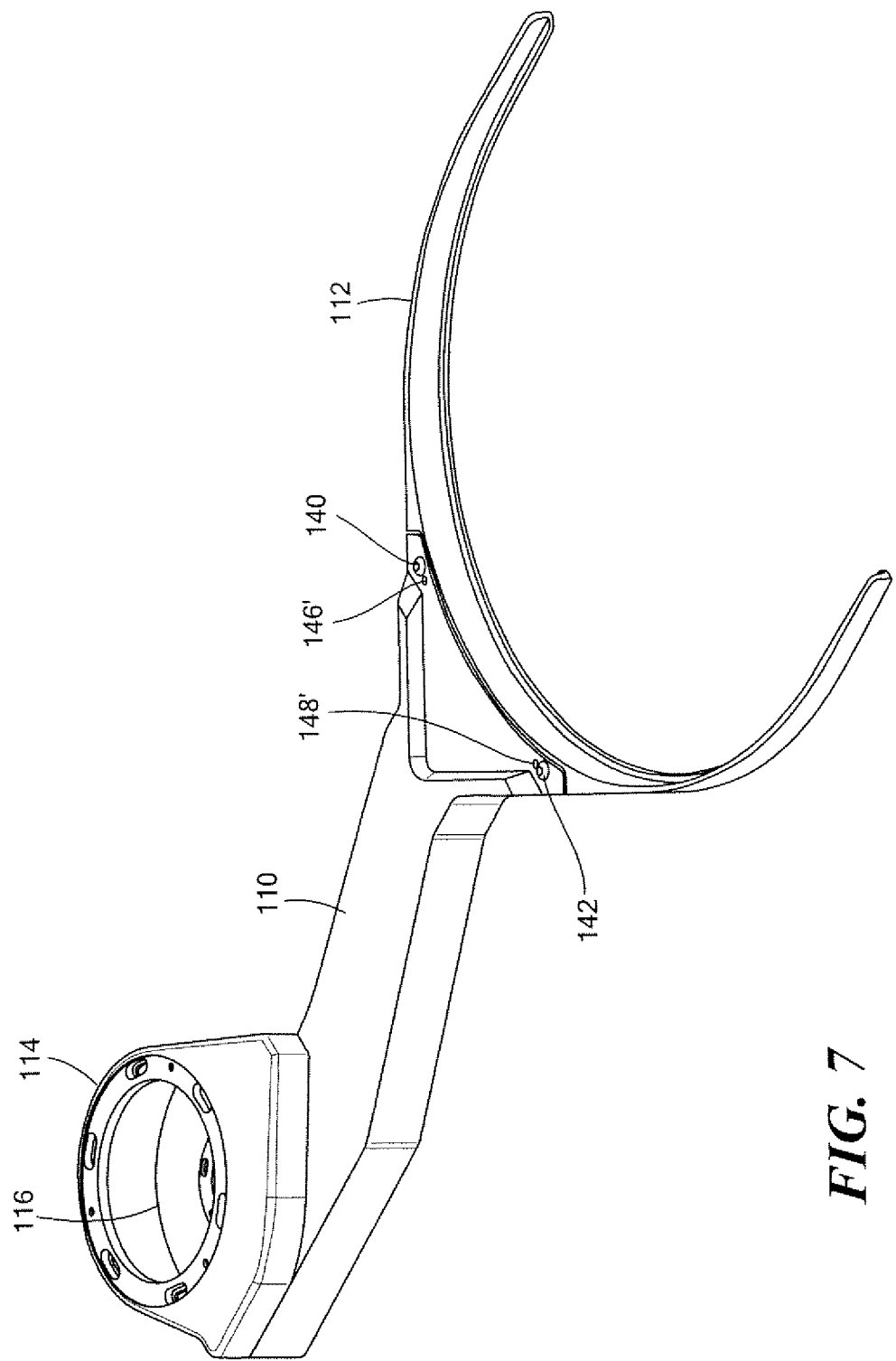
FIG. 7 is a schematic three dimensional view of an assembled wrist link and end effector in accordance with an example of the invention.
Figure 8:
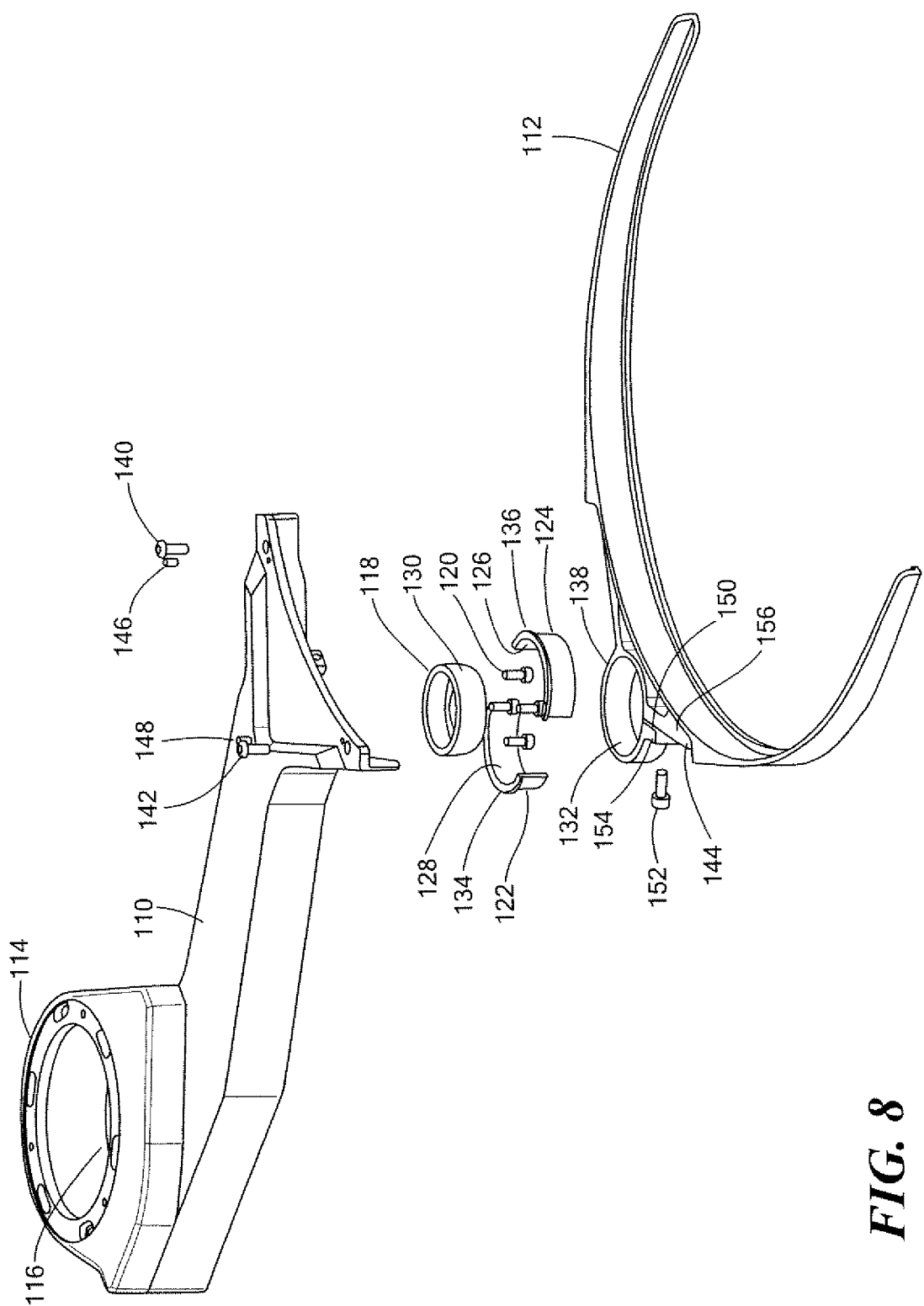
FIG. 8 is an exploded isometric view of the wrist link and end effector of FIG. 7 having features in one version of the disclosed embodiment.

Referring now to FIGS. 7 and 8, there are shown alternate embodiments of wrist 110 and end effector 112. Wrist 110 includes upper and lower flanges 114, 116 suitable for being fastened to drum 26 of forearm 22 as previously described. Wrist 110 has ball portion 118 fastened thereto with screws 120. Ball 118 is received in socket 132. A split spherical sleeve portions 122, 124 have spherical inner faces 126, 128 that mate with spherical outer face 130 of ball portion 118. Wrist 112, socket 132 is adapted to receive the split sleeve sections 122, 124 where assembly may require the sleeve sections 122, 124 to be assembled to the ball portion 118 and then slid into or otherwise engaged in socket 132 such that end effector 112 may be rotatable with respect to ball portion 118.

Sleeve shoulders 134, 136 may seat on upper face 138 of socket 132, for example, to locate the spherical joint in elevation. The fit of sleeve sections 122, 124, ball portion 118 and socket 132 may be loose, line to line or interference as needed.

Screws 140, 142 fasten wrist link 110 to end effector 112 at the upper facing face 144 of end effector 112 where set screws 146, 148 may similarly interface with the upper face 144 and, used in combination with screws 140, 142, provide adjustment and leveling of end effector 112 relative to wrist 110. Thus, the end effector 112 is coupled to the wrist 110 via an adjustable joint including a rotating portion comprising the ball 118 and the socket 132 for rotating the end effector 112 with respect to the wrist 110, and a two point mount comprising the screws 140, 142, where the end effector 112 is coupled to the wrist 110 with a leveling adjustment at the adjustable joint comprising the set screws 146, 148. Socket 132 may have split cut 150 and locking screw 152 that engages a clearance hole 154 in flange 154 of split cut 150 and a threaded portion of flange 156 of split cut 150. Upon completion of leveling and adjustment of end effector 112 relative to wrist 110, screw 152 may be tightened to lock the position of the end effector 112, sleeve sections 122, 124 and ball portion 118 relative to each other.

Figure 9:
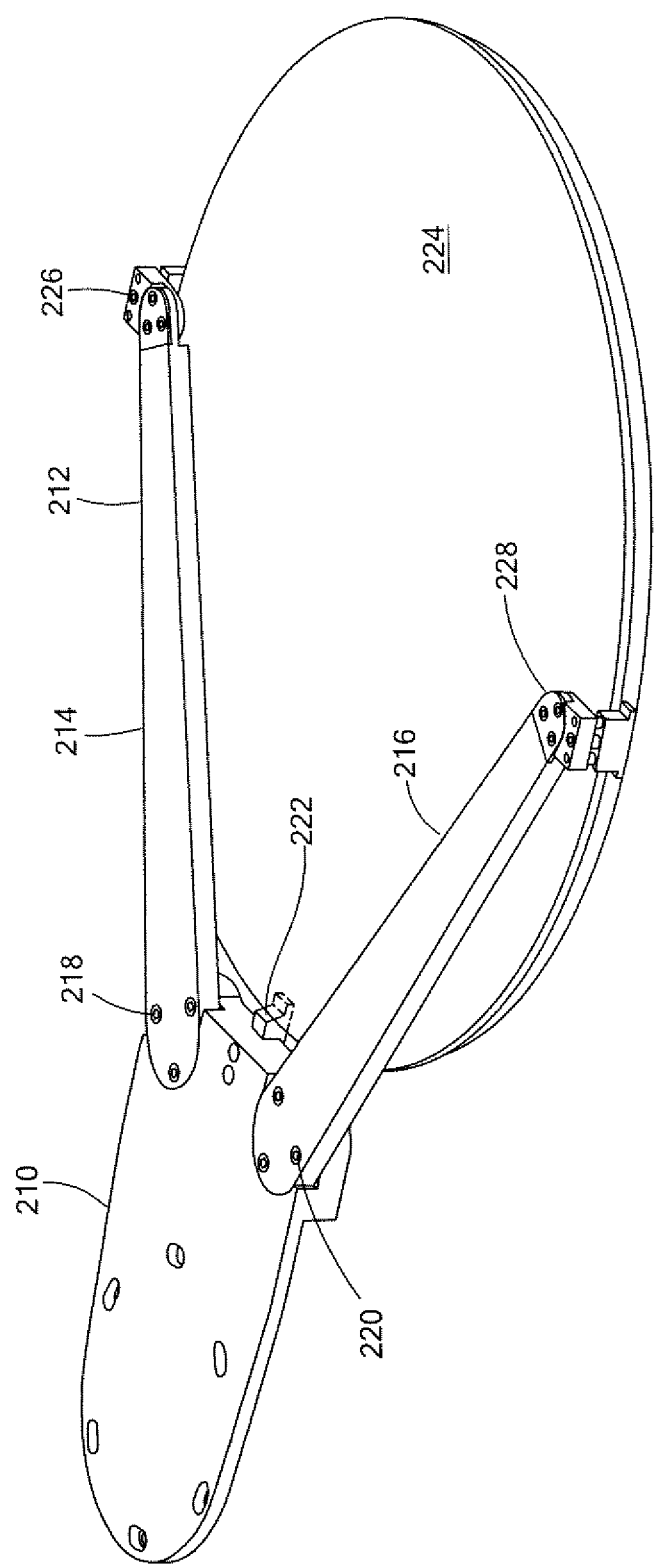
FIG. 9 is a schematic three dimensional view of an assembled wrist link and end effector in accordance with an example of the invention.
Figure 10:
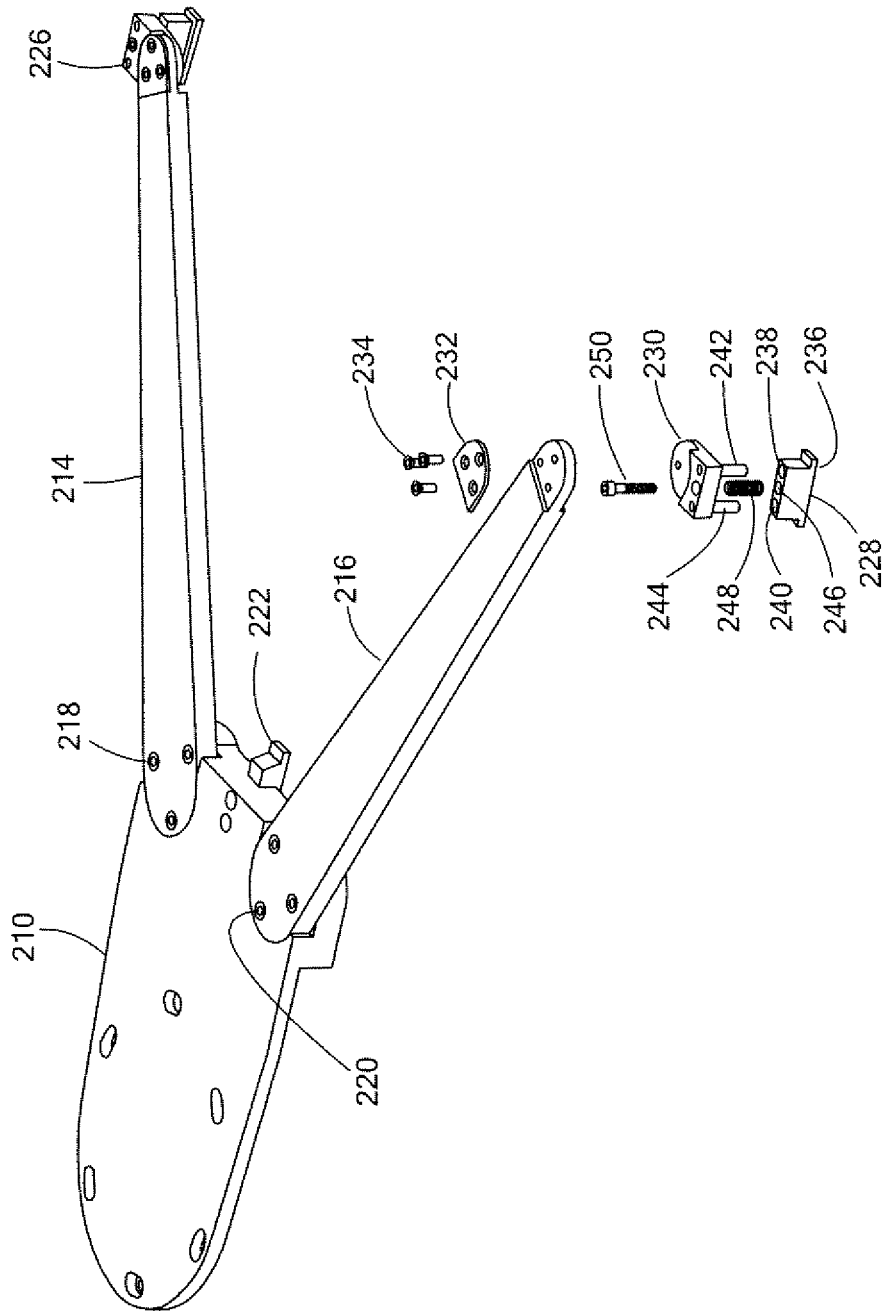
FIG. 10 is an exploded isometric view of the wrist link and end effector of FIG. 9 having features in one version of the disclosed embodiment.

Referring now to FIGS. 9 and 10, there are shown alternate embodiments of wrist 210 and end effector 212. Wrist 210 may similarly include upper and lower flanges suitable for being fastened to drum 26 of forearm 22 as previously described. End effector 212 has first and second extensions 214, 216 coupled to wrist 210 with screws 218, 220 respectively. A rear support 222 supports a rear edge of substrate 224 and is similarly coupled to wrist 210. First and second extensions 214, 216 have first and second adjustable end effectors 226, 228. Here, first and second adjustable end effectors 226, 228 may have similar features as will be described with respect to second adjustable support 228. Adjustable effector 228, FIG. 10 has stationary block 230 coupled to extension 216 with plate 232 and fasteners 234. Adjustable block 236 has bores 238, 240 configured to accept pins 242, 244 pressed into block 230. Counter bore 246 of adjustable block 236 has a bore portion and seat portion configured to accept spring 248 and a threaded portion configured to accept adjustment screw 250. In this manner, rotation of adjustment screw 250 adjusts the elevation of the edge of substrate 224 supported. Similarly adjustment of end effector 226 adjusts the elevation of the edge of substrate 224 supported.

Although specific features are shown in some drawings and not in others, this is for convenience only as each feature may be combined with any or all of the other features. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A robot arm comprising:
   a wrist;
   an end effector coupled to the wrist via an adjustable joint, where the adjustable joint comprises a rotating portion and a two point mount, where the rotating portion couples the wrist to the end effector and is configured to allow the end effector to rotate with respect to the wrist, and where the two point mount is directly attached to both the wrist and to the end effector; and
   a leveling adjustment at the adjustable joint, where the leveling adjustment comprises the two point mount and is configured to adjust and level the end effector relative to the wrist,
   where the rotating portion comprises a socket on one of the end effectors or the wrist, and the rotating portion further comprises a ball on the other of the end effector or the wrist, where the ball is in the socket.

2. The robot arm of claim 1 further comprising a sleeve between the ball and the socket.

3. The robot arm of claim 2 in which the sleeve is in a plurality of sections.

4. The robot arm of claim 3 in which the sleeve has a shoulder seated on a periphery of the socket.

5. The robot arm of claim 1 where the leveling adjustment comprises a set screw in the wrist abutting the end effector for leveling the end effector.

6. The robot arm of claim 1 in which the socket is split and tightenable about the ball.

7. A robot arm comprising:
   a wrist;
   an end effector coupled to the wrist via an adjustable joint, where the adjustable joint comprises a rotating portion and a multi-point mount, where the rotating portion couples the wrist to the end effector and is configured to allow the end effector to rotate with respect to the wrist, and where the multi-point mount is directly attached to both the wrist and to the end effector; and
   a leveling adjustment at the adjustable joint, where the leveling adjustment comprises at least a portion of the multi-point mount and is configured to adjust and level the end effector relative to the wrist,
   where the rotating portion is spaced from the leveling adjustment,
   where the rotating portion comprises a socket on the end effectors or the wrist, and the rotating portion further comprises a ball on the other of the end effector or the wrist, where the ball is in the socket.

8. The robot arm as in claim 7 where the multi-point mount comprises a two point mount.

9. The robot arm as in claim 7 further comprising a sleeve between the ball and the socket.

10. The robot aim as in claim 7 where the sleeve has a shoulder seated on a periphery of the socket.

11. The robot arm as in claim 7 where the socket is split and tightenable about the ball.

12. The robot arm as in claim 7 where the leveling adjustment comprises a set screw in the wrist abutting the end effector for leveling the end effector.

* * * * *